United States Patent [19]
Fritts et al.

[11] Patent Number: 6,021,970
[45] Date of Patent: Feb. 8, 2000

[54] FISHING REEL

[76] Inventors: Jerry LeRoy Fritts; Sharon Ann Fritts, both of 301 NE. Highway YY, Clinton, Mo. 64735

[21] Appl. No.: 09/041,993

[22] Filed: Mar. 13, 1998

[51] Int. Cl.[7] ................................................. A01K 89/01
[52] U.S. Cl. ......................... 242/227; 242/228; 242/241; 242/242
[58] Field of Search .................................... 242/227, 228, 242/241, 242

[56] References Cited

U.S. PATENT DOCUMENTS

| | | | |
|---|---|---|---|
| 1,625,988 | 4/1927 | Dice | 242/228 |
| 2,549,029 | 4/1951 | Stalder . | |
| 2,676,769 | 4/1954 | Sarah | 242/233 |
| 2,732,147 | 1/1956 | Rotter | 242/228 |
| 2,736,979 | 3/1956 | Le Gal | 242/233 |
| 2,942,798 | 6/1960 | Alinari . | |
| 2,966,314 | 12/1960 | Mombur . | |
| 3,379,391 | 4/1968 | Fincannon . | |
| 3,419,992 | 1/1969 | Strahm . | |
| 3,534,919 | 10/1970 | Rowe . | |
| 3,727,857 | 4/1973 | Chann . | |
| 3,908,927 | 9/1975 | Louison | 242/233 |
| 4,408,729 | 10/1983 | Moss et al. . | |
| 4,523,726 | 6/1985 | Swisher . | |
| 4,892,267 | 1/1990 | Webb | 242/228 |
| 4,938,433 | 7/1990 | Toda | 242/245 |
| 4,982,912 | 1/1991 | Urso | 242/231 |
| 5,244,165 | 9/1993 | Valentine et al. | 242/244 |
| 5,350,132 | 9/1994 | Hitomi | 242/247 |
| 5,467,932 | 11/1995 | Puryear | 242/228 |
| 5,586,734 | 12/1996 | Kawabe et al. | 242/247 |
| 5,605,299 | 2/1997 | Henriksson | 242/247 |

FOREIGN PATENT DOCUMENTS

| | | | |
|---|---|---|---|
| 859236 | 12/1940 | France | 242/228 |
| 26 19 077 | 11/1977 | Germany | 242/228 |
| 822851 | 11/1959 | United Kingdom | 242/228 |

*Primary Examiner*—Donald P. Walsh
*Attorney, Agent, or Firm*—Head, Johnson & Kachigian

[57] ABSTRACT

A spinning reel having a housing and a spool for line. The line spool is parallel to a rod. The reel includes a spool rotation on an axial movement mechanism in order to move the spool both rotationally and axially in relation to the housing. A bail is moveable between a casting position and a line retrieval position. A drive mechanism drives the spool movement mechanism in order to wind the line onto the spool.

14 Claims, 7 Drawing Sheets

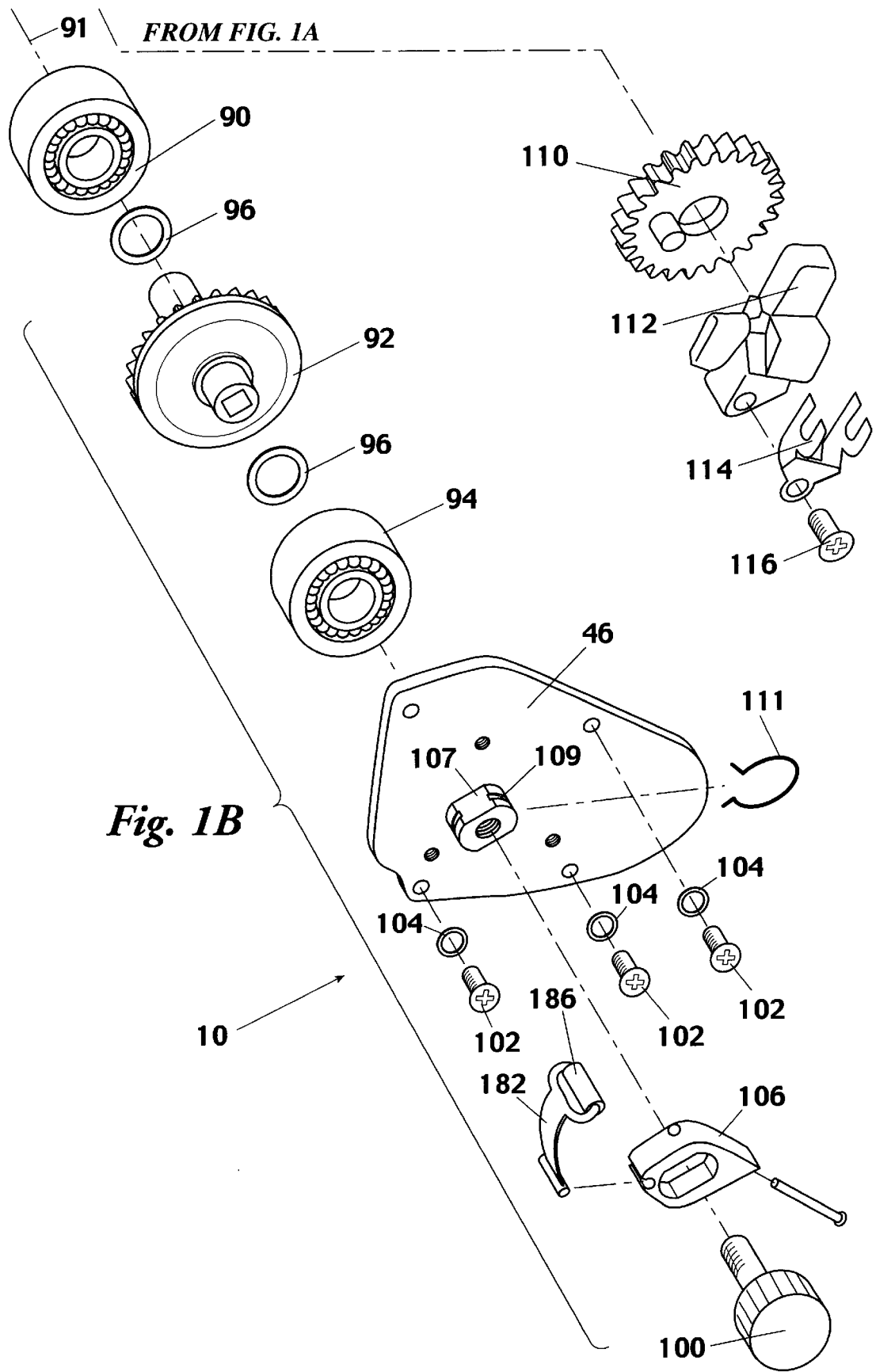

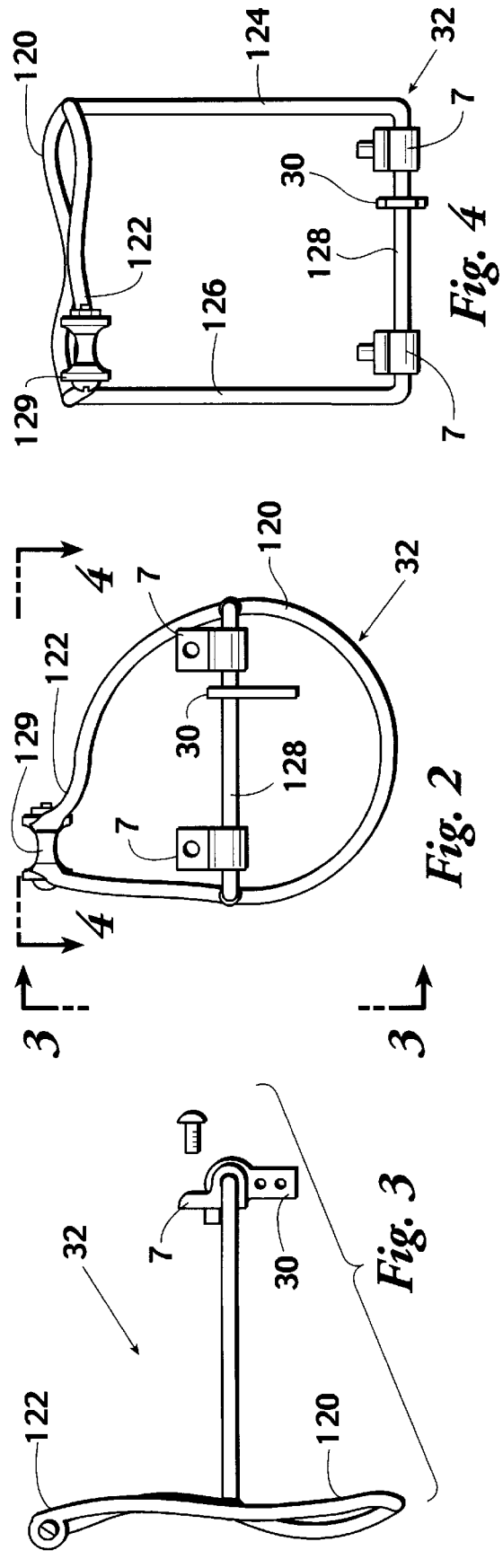

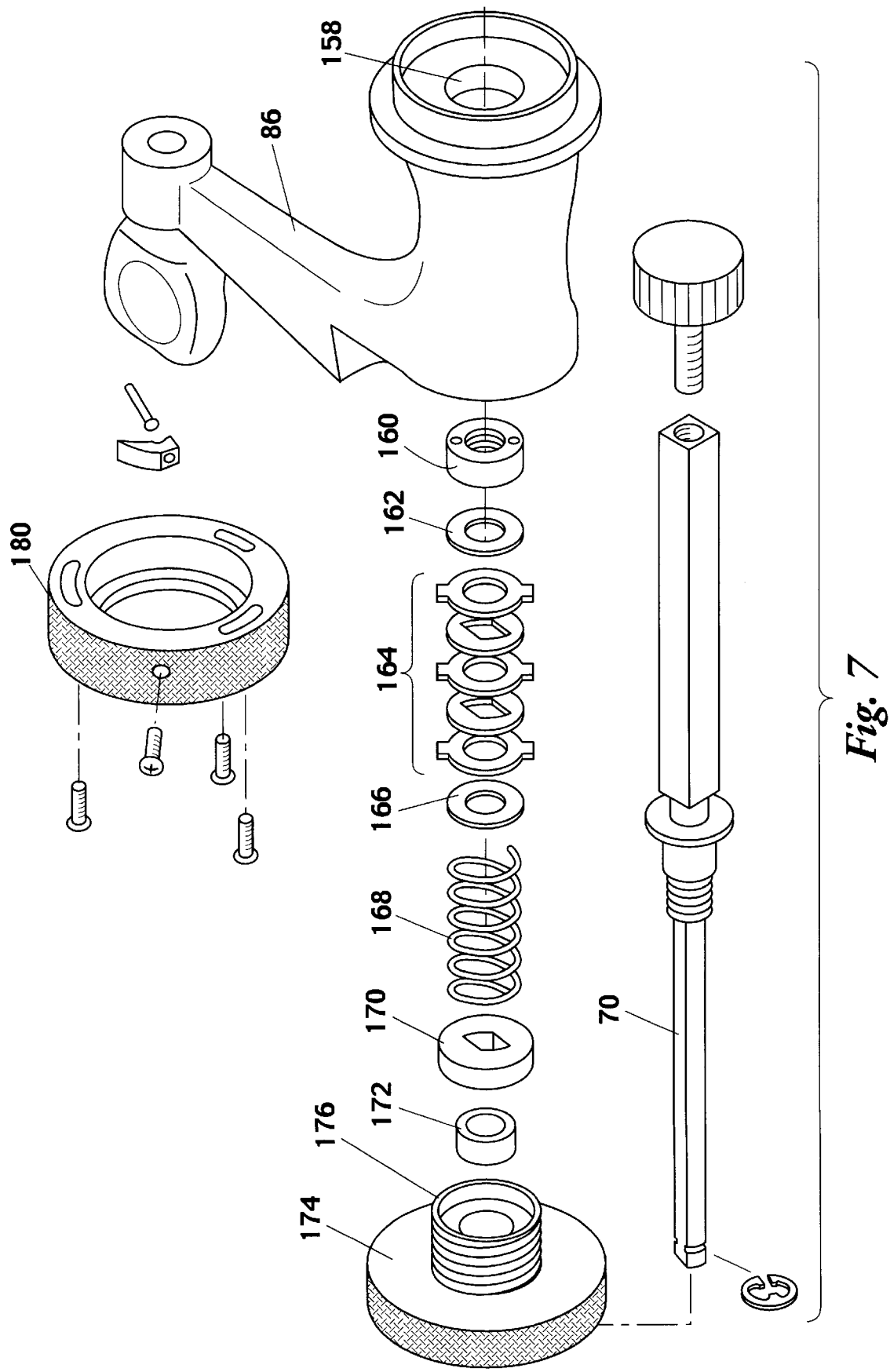

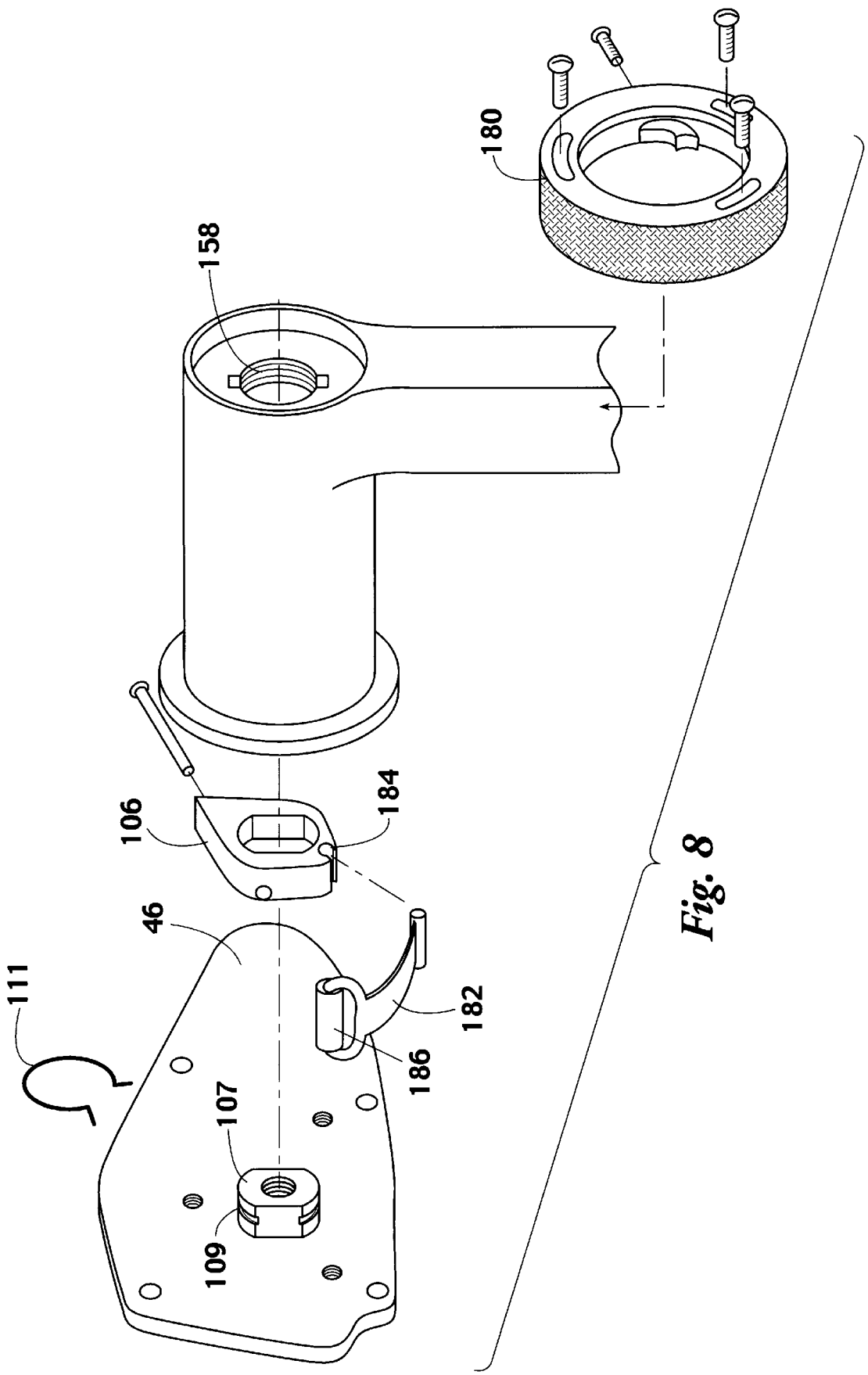

FISHING REEL

BACKGROUND OF THE INVENTION

1. Field of the Invention

The present invention relates to fishing reels, particularly the open-face type. In particular, the present invention relates to a spinning or spin casting reel having an improved fishing line control mechanism for release and recovery of line.

2. Prior Art

Fishing reels may be of the spinning type, where the axis of the line spool is parallel to the fishing rod, or they may be of the fly or casting reel type where the axis of line spool is perpendicular to the fishing rod.

Spinning reels or spin casting reels are made in both open face configuration and with a cover over the spool mechanism.

In the current open face spinning reel art, the reel consists of a housing to the front of which is attached a spool which holds the fishing line. The housing is attached to the rod by means of a support member called a leg or mount and an attachment member called a foot.

Around and to the outside of the spool is a rotating member, which is called a yoke. To the outside of the yoke is attached a means for guiding the fishing line onto the spool which is called a bail arm. At one end of the folding and rotating bail arm is a line guide. The bail arm is pivotable about its supports on the yoke, such that it may be moved in either of two positions, open for casting out the fishing line, and closed for reeling the line back onto the spool.

On one side of the housing, there is a crank with a handle which is to be used in reeling in or recovery of the fishing line. The inside of the housing contains the mechanisms, gears and bearings allowing for reeling in of the fishing line. Most fishing reels also have braking systems called drag adjustments which are mounted at either the extreme front end or rear end of the reel assembly.

Another feature of present open face reels is the level wind feature. As the crank is operated to retrieve the line, the spool is moved forward and back along its axis thus causing the line to be wound in even layers over the width of the spool.

Some fishing reels allow for moving the crank and handle to either side of housing to allow easy use by either left or right-handed fisherman. Others also come equipped with trigger means for releasing the bail to allow for casting.

The present invention relates to improvements designed to overcome the disadvantages of the existing fishing reels as described.

In the improved version of the present invention, the spool not only oscillates axially but rotates as well. Having the spool rotate in the line retrieval mode allows for elimination of the yoke. By discarding the yoke, the outside diameter of the reel may be substantially reduced for the same capacity reel. Further, with a rotating spool the skirt may be made smaller. Both the skirt size reduction and yoke eliminations results in a reduction in overall weight of the reel. The removal of the yoke also allows for a reduction in length of the reel axially. Fishermen will benefit from weight reduction by decreased fatigue, while the removal of the yoke, which is inherently unbalanced, results in improving the balance of the reel for additional advantage and ease of operation. The weight reduction and component reduction reduces cost of manufacture.

Accordingly, it is a principal object and purpose of the present invention to provide an open face fishing reel having a spool that oscillates axially and rotates as well.

Another major disadvantage of present reels is the tendency for line snagging during retrieval or recovery, particularly by virtue of the open bail which allows the line to be wound outside the spool and often over the yoke or other portions of the reel. These types of difficulties are most often encountered by less experienced reel fishermen or even by experienced fishermen casting in the evening when misreeling is less noticeable at the onset.

The invention overcomes these difficulties by providing a novel closed loop bail. The closed loop bail of the invention is formed in a generally circular shape with a small bail extension on a point in the bail circumference where the line guide is located. The closed loop bail has a circumference larger than the outside diameter of the spool. In the bail closed position, the bail extension and line guide will be at a point slightly away from a 12 o'clock position, i.e. a point nearest the rod. In contrast, in existing devices the line must find the line guide when re-reeling first is started. In the present invention the line is always automatically positioned at the optimum location, which is at the point where the bail extension and line guide are closest to the rod. This feature assures that the line is wound on the spool each time, and not on some other part of the reel.

Accordingly, it is an additional object and purpose of the present invention to provide an open face fishing reel having a closed loop bail.

Another advantage of the present bail improvement, is the line tensioning achieved whenever the bail is moved to the reeling or retrieval position. In this invention, the line is always at the same point with respect to the bail circumference. When the bail is pivoted, the line is automatically tensioned a small amount, but sufficient to improve line control and help prevent improper spooling.

Alternatively, the bail can be made to operate in an automatic up or retrieval mode. By attaching an internal spring hooked to a bail pivot lever to an attachment point below the centerline of the bail's pivot point, the bail would operate in the retrieval mode. The bail would remain in the casting position only as long as a switch or trigger was activated.

An additional feature of the present invention is a switch or trigger on the leg or mount which retains the bail when in a line retrieval or recovery position. Release of the trigger allows the bail to move to a line casting position.

Accordingly, it is an additional object and purpose of the present invention to provide an open face fishing reel which may be released from the line retrieval position with a trigger.

A further advantage of the present system is that it allows for moving the drag adjustment from its axial location as on present devices, to a position on the side of the housing at the crank and handle.

By locating the drag control on the crank, a fishermen need not move his hands to adjust drag, but may do so while holding on to the rod and reel as in normal position, thus improving ease of playing fish and reducing chance of losing the fish or causing snags in the line.

Accordingly, it is an additional object and purpose of the present invention to provide an open face fishing reel having a drag control adjustment and anti-reverse selector at the crank and handle.

BRIEF DESCRIPTION OF THE DRAWINGS

FIGS. 1A, 1B and 1C are exploded views which, taken together, illustrate an improved fishing reel constructed in accordance with the present invention;

FIGS. 2, 3 and 4 illustrate a front, side and top view of a novel bail utilized in the improved fishing reel shown in FIGS. 1A, 1B and 1C;

FIGS. 7 and 8 are exploded views of a drag assembly in the improved fishing reel shown in FIGS. 1A, 1B and 1C.

DETAILED DESCRIPTION OF THE PREFERRED EMBODIMENTS

Figure 1A:
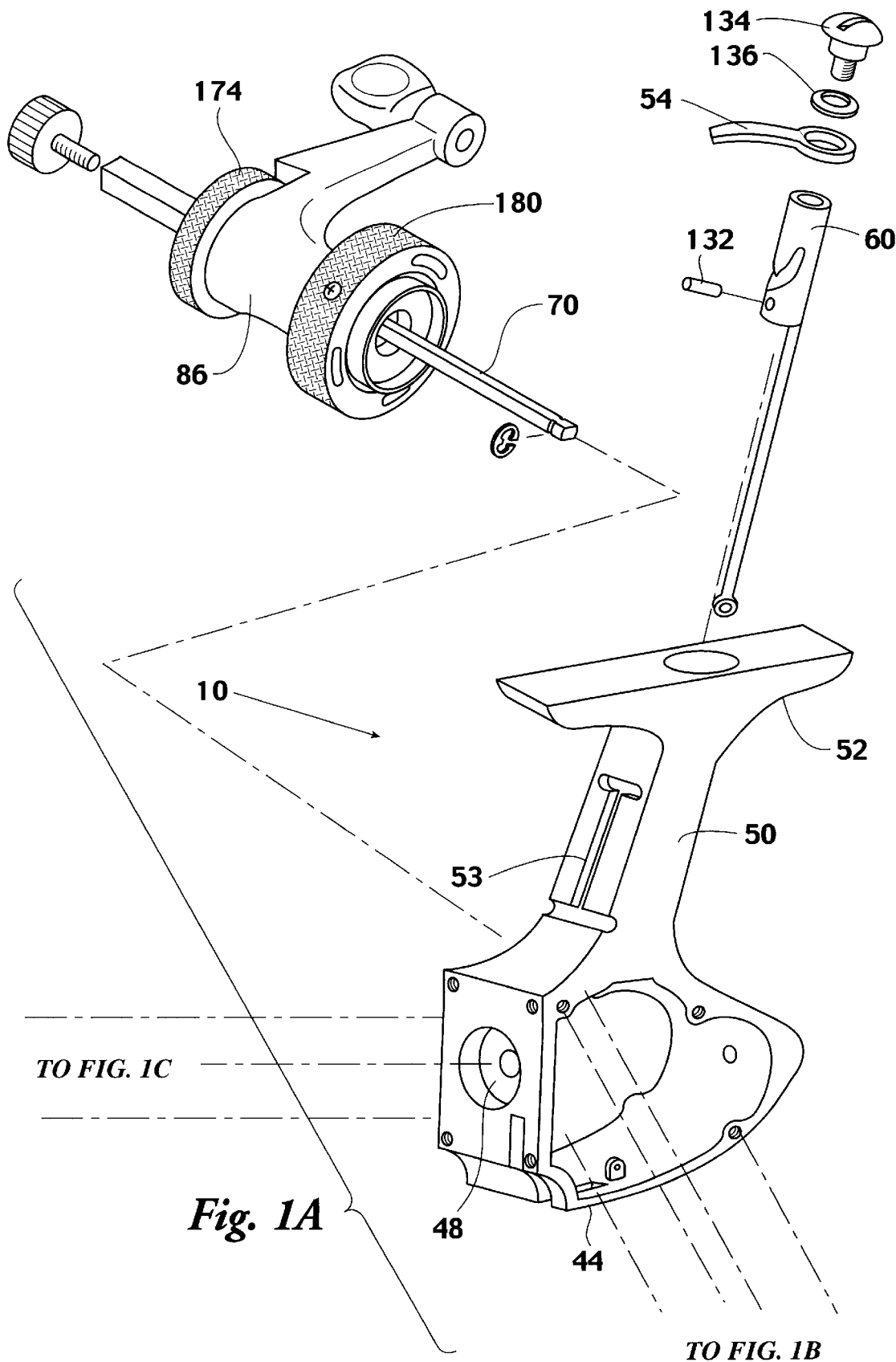

Referring to the drawings in detail, FIGS. 1A, 1B and 1C are exploded views showing the various elements which, taken together, illustrate an improved fishing reel constructed in accordance with the present invention.

The reel 10 includes a spool assembly 12 having a desired length of line 14 wound thereon. The spool 12 will be generally parallel to a rod (not shown) which is well known in the art. The spool 12 includes a central, axial opening 15 through which extends a main level-wind shaft 16 retained thereon by a spool retaining clip 18 received in a notch 19 in the shaft 16.

The main level-wind shaft 16 passes through a spool drive and retaining nut 20 having a central opening to receive the main shaft 16. The spool drive nut 20 includes a plurality of extending fingers 22. In the present embodiment, the spool drive nut 20 includes three fingers which mate with and engage an equal number of recesses in a face of the spool 12 (not visible in FIG. 1). It will be understood that a greater or lesser number of fingers might be employed.

The face of the spool is recessed from an extending skirt 23. The spool 12 will rotate and move axially about level-wind shaft 16. Rotation of the spool will wind the line thereon.

A plurality of screws 24 pass through a bearing retainer plate 26 and will ultimately be fastened to a center housing (shown on FIG. 1A). The bearing retainer plate 26 has a center opening 28 which receives a bail frame support shaft (to be described) therethrough.

A pivot shaft lever 30 will be in operative engagement with the bail (to be described in detail).

A thrust washer 36 and bearing 38 are mounted on a pinion gear 40 which passes through the bearing retainer plate 26 and is threadably engaged with the spool drive nut 20.

Figure 5:
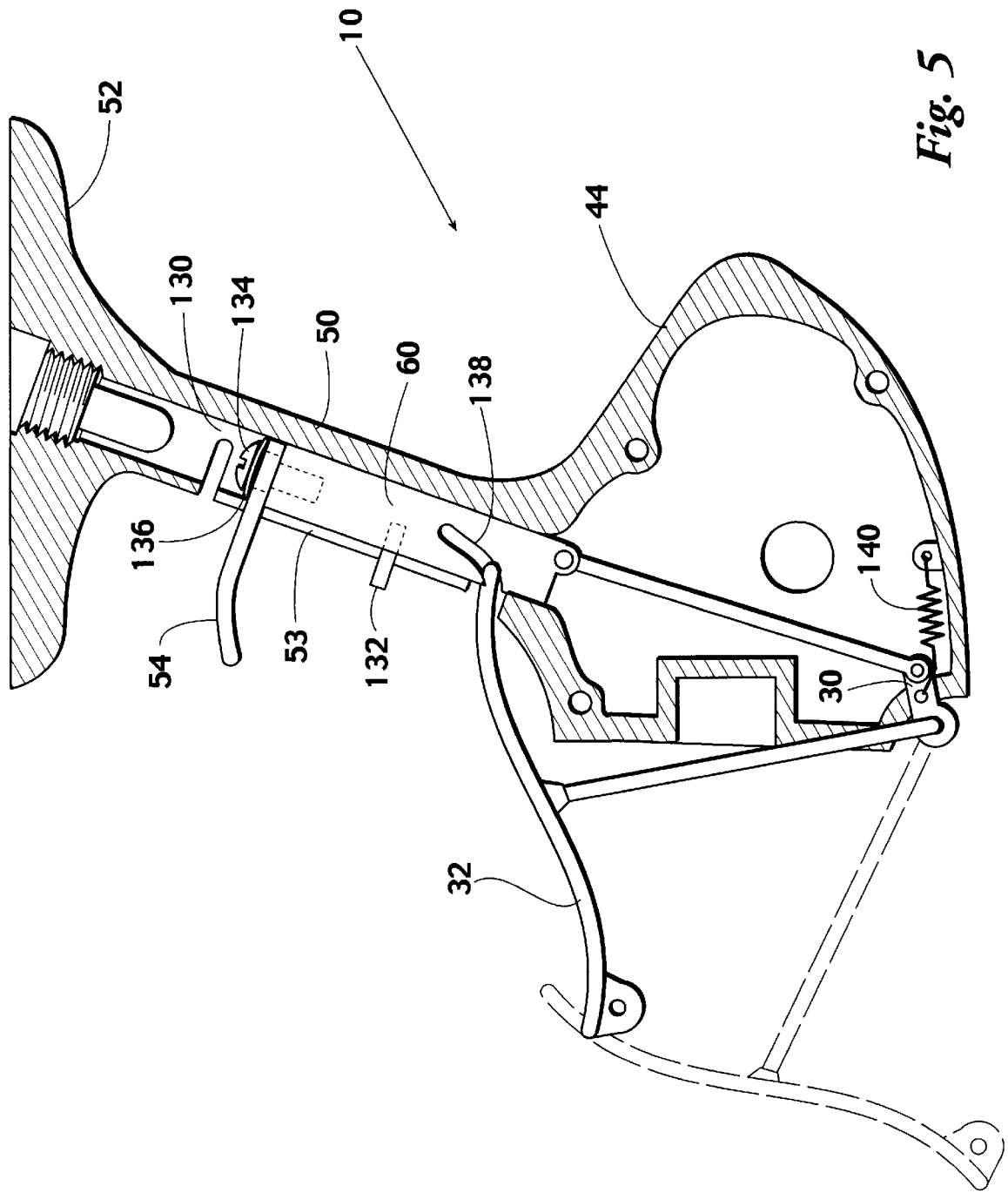
FIG. 5 illustrates an exploded view of a bail locking mechanism in the improved fishing reel shown in FIGS. 1A, 1B and 1C.

In operation, the drive nut rotates but does not oscillate axially. With reference to FIG. 1A, the housing in the present embodiment is in two sections, a first housing 44 and a second center housing 46 (not shown in FIG. 1A). Other housing arrangements are, of course, possible within the scope of the invention. The pinion gear 40 extends into and through the opening 48 in the housing 44. Extending from the housing 44 is a mount 50 which terminates in a foot 52 which is attached to the rod (not shown) in any known manner. Operating within a slot in the mount 50 is a trigger 54 which will move between a line retrieval and a line casting position. The trigger 54 has an inside extending post which engages with an opening in a bail locking pin 60. Movement of the trigger 54 will move the bail locking pin 60. As seen in FIG. 5, a bail locking spring 140 and screw 134 assist in keeping the trigger 54 in the normally closed position. The spring force may be overcome by grasping with the finger. A reel shaft 70 engages with a drag bushing collar 172. As seen in FIG. 7, clutch disks 164 and drag coil spring 168 also surround the reel shaft. A drag bushing 170 cooperates with a thrust washer 166 and a drag friction knob 174 to adjust the tension or drag of the reel. The crank handle 86 rotates the shaft 70 which causes the line to wind on the spool.

With reference to FIG. 1B, the reel shaft 70 from FIG. 1A extends through drive gear ball bearing 90 as indicated by dashed line 91.

Drive gear 92 is in axial alignment with drive gear ball bearing 90 and will engage reel shaft 70 (shown on FIG. 1A).

Drive gear ball bearing 94 and thrust washers 96 are received over drive gear 92.

Crank handle shaft retaining screw 100 passes through housing 46 and into drive gear 92.

A plurality of screws 102 and washers 104 hold the housing 46 to the center housing 44 (not shown in FIG. 1B). An anti-reverse ramp 106 (to be seen in detail below) fits over projection 107 on housing 46.

Housing 46 includes projection 107 having a snap ring groove 109 for snap ring 111 to hold the anti-reverse ramp 106 against the housing.

A spool level-wind drive gear 110 cooperates with an oscillating slider 112, an oscillating slider retainer 114 and a screw 116 to oscillate the spool 12 (seen in FIG. 1C) axially.

FIG. 2 shows a front view, FIG. 3 shows a side view and FIG. 4 shows a top view of a circular bail 32 which is a part of the present invention. The bail 32 includes a substantially circular loop 120 having an eccentric area 122 as best seen in FIG. 2.

Extending from the circular loop 120 are a pair of legs 124 and 126 which are parallel to each other and a bail shaft 128 which extends between the legs.

The eccentric area may include a roller or guide 129 for the line.

Figure 6:
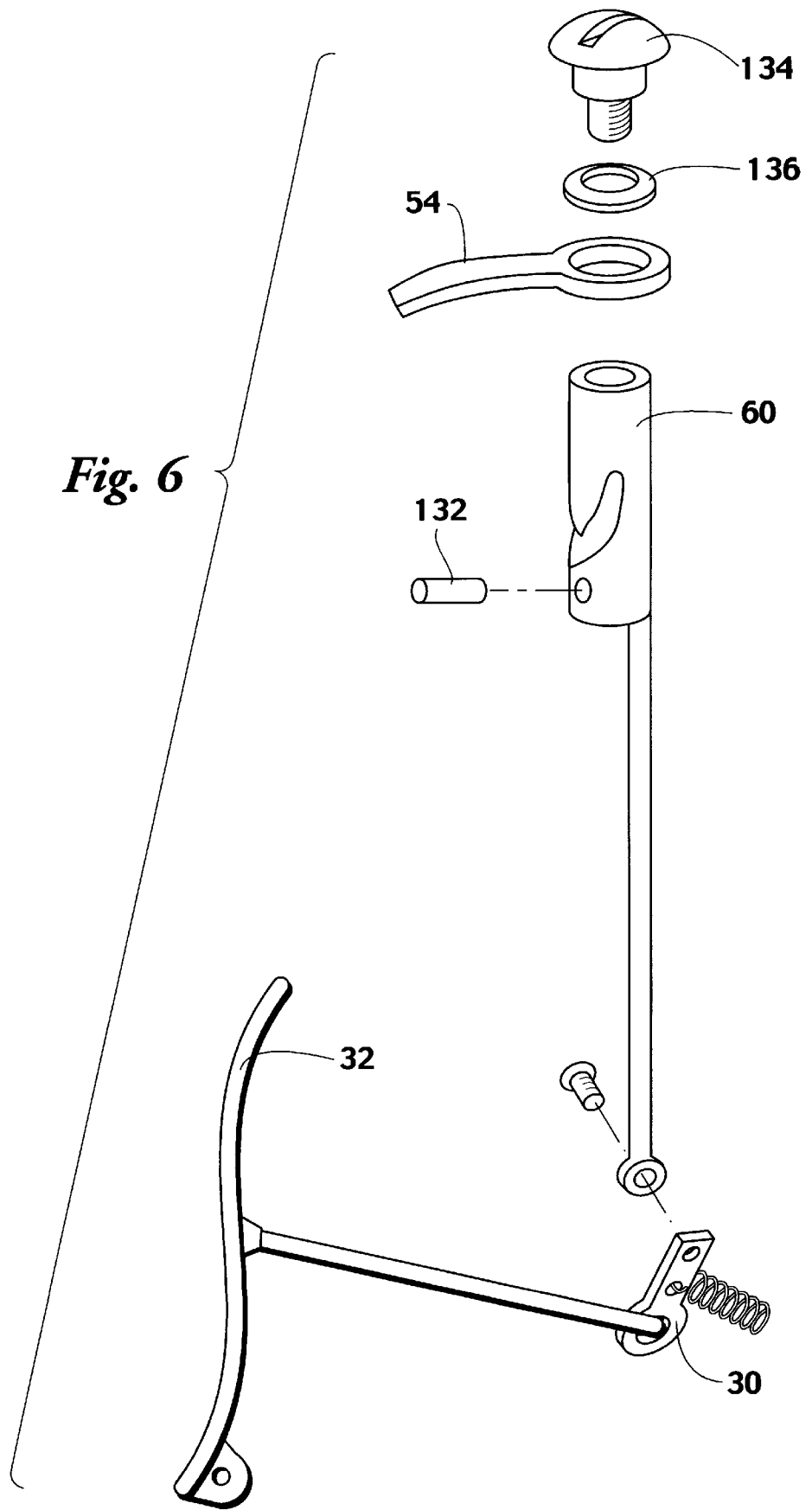
FIG. 6 is an exploded view of a bail movement and locking assembly in the improved fishing reel shown in FIGS. 1A, 1B and 1C.

FIG. 5 illustrates a sectional view of the reel 10 with portions removed while FIG. 6 illustrates an exploded view of the bail movement, bail actuator and position lock mechanism. In FIG. 5, the foot 52 would be connected to a rod (not shown). Extending from the foot 52 is a mount 50 which is in angular relation to both the foot and the rod. The trigger 54 extends from and operates in a slot 53 which is in communication with an opening 130 in the mount. A guide pin 132 extending from the bail locking pin 60 moves in the slot 53 and prevents rotational movement of the locking pin 60. A screw 134 and washer 136 connects the trigger 54 to the locking pin 60.

The locking pin 60 contains a notch 138 to retain the bail 32 when in the line retrieval position. The bail shaft 128 is welded or otherwise rigidly secured to the pivot shaft lever 30. A spring 140 anchored on one end to the housing urges the bail toward the line casting position (shown in dashed lines). Location of the trigger permits movement while the fisherman's hand is on the rod.

The bail is shown in the line recovery position in FIG. 5. The dashed line position of the bail is the casting position.

As can be appreciated, the line will always pass through the bail 32.

FIGS. 7 and 8 are exploded views illustrating the drag mechanism assembly of the present invention.

A cylindrical opening 158 in the handle 86 forms a drum and will receive in sequence a bushing 160, a washer 162, a series of washers 164 with tabs to fit matching internal key ways, a washer 166, a compression spring 168, a bearing 170 and a bushing 172. The foregoing is received over shaft 70.

A knob 174 has a threaded end 176 which engages with internal threads in the cylindrical opening 158 of the handle 86. Rotation of the knob 174 adjusts the tension or drag.

An anti-reverse knob 180, shown in FIG. 7, is shown in detail in FIG. 8. The ramp 106 is attached to the housing 46 via a snap ring 111. A roller leaf spring assembly 182 will be engaged with the ramp 106 at slot 184. As long as the drum, which is formed by the cylindrical opening in the handle 158, is rotated in the counter clockwise retrieval direction, the friction created between the roller 186 and drum will force the roller away from the ramp.

The counter clockwise rotation keeps the roller out of a wedging action created by the arc of the drum and the incline of the ramp, allowing the handle to continue its counter clockwise rotation. Alternatively, if the reel handle is rotated in a clockwise direction, the roller would be trapped in a wedging motion, in effect, jamming the roller between the ramp and the drum locking the handle against any clockwise rotation. In this motion, the reel spool through the gear train can rotate against the clutches in the drag assembly without any rotation of the reel retrieval handle.

The anti-reverse function is selected or deselected by a rotating ring which has a detent or a cam pushing a plunger or pin which contacts the leaf spring assembly, forcing the roller away from this potential wedging action. It will remain in that position until the anti-reverse function is selected and the pin is allowed to retreat by moving the detent away from the pin.

Whereas, the present invention has been described in relation to the drawings attached hereto, it should be understood that other and further modifications, apart from those shown or suggested herein, may be made within the spirit and scope of this invention.

What is claimed is:

1. A spinning reel having a housing and a spool for line, said spool having an axis mounted parallel to a rod, the reel comprising:

a spool rotational and axial movement mechanism to move said spool both rotationally and axially in relation to said housing;

a bail extending from said housing, said bail defining a planar ring and moveable between a casting position and a line retrieval position wherein said bail is not perpendicular to said spool axis in said casting position and said bail is not parallel to said spool axis in said line retrieval position; and a drive mechanism to drive said spool movement mechanism in order to wind said line on to said spool.

2. A spinning reel as set forth in claim 1 including a drive nut with extending fingers and wherein said spool has a face and wherein said spool rotational and axial movement mechanism includes a plurality of recesses in said spool which engage said fingers extending from said drive nut.

3. A spinning reel as set forth in claim 1 including a drive gear wherein said drive mechanism includes a crank handle engaged with said drive gear within said housing.

4. A spinning reel as set forth in claim 1 including a pair of legs extending from said bail wherein said bail entirely surrounds said spool, said bail forming a continuous circular loop and includes a portion which is radially spaced outside of said circular loop for receipt of said line, wherein said line always passes through said bail circular loop.

5. A spinning reel having a housing and a spool for line, said spool being mounted parallel to a rod, the reel comprising:

a bail entirely surrounding said spool, said bail having a diameter larger than said spool, said bail forming a continuous circular loop and includes a portion which is radially spaced outside of said circular loop for receipt of said line therethrough; and a pair of legs extending from said bail.

6. A spinning reel as set forth in claim 5 including a roller in said eccentric area for receipt of said line.

7. A spinning reel as set forth in claim 5 wherein said bail includes a pair of legs and a shaft extending between said legs.

8. A spinning reel as set forth in claim 7 wherein said bail is moveable about said shaft between a casting position surrounding said spool and a line retrieval position wherein said bail is adjacent said housing, wherein said line always passes through said bail circular loop.

9. A spinning reel as set forth in claim 8 including:

a mount extending between said housing and said rod;

a locking pin moveable within said mount and being engaged with said bail when in a first retrieval position and disengaged from said bail when in a second trigger release position; and a trigger on said mount moveable between said first position to retain said bail in said line retrieval position and said second release position for said line casting position.

10. A spinning reel as set forth in claim 9 wherein said locking pin moves within a channel in said mount.

11. A spinning reel as set forth in claim 9 including a connecting post extending between said locking pin and said bail and including at least one spring so that said bail will normally pivot to said casting position.

12. A spinning reel as set forth in claim 11 wherein said locking pin includes a notch to engage said bail.

13. A spinning reel having a housing and a spool for line, which reel comprises:

said spool being mounted on and parallel to a rod and having an open face and a plurality of recesses therein;

a nut having extending fingers which engage said spool recesses;

a drive gear engaging said nut wherein rotation of said drive gear rotates said nut;

a drive shaft coupled to said spool;

a spring and a plurality of bushings surrounding said drive shaft between said drive gear and a knob; and wherein said knob may be adjusted axially on said drive shaft to adjust drag force on said spool.

14. A spinning reel as set forth in claim 5 including a guide in said eccentric area for receipt of said line.

* * * * *